(12) United States Patent
Rushton (10) Patent No.: US 7,238,001 B2
(45) Date of Patent: Jul. 3, 2007

(54) SEAL ARRANGEMENT

(75) Inventor: Guy J Rushton, Malmesbury (GB)

(73) Assignee: Rolls-Royce plc, London (GB)

( * ) Notice: Subject to any disclaimer, the term of this patent is extended or adjusted under 35 U.S.C. 154(b) by 184 days.

(21) Appl. No.: 11/016,995

(22) Filed: Dec. 21, 2004

(65) Prior Publication Data
US 2005/0214112 A1   Sep. 29, 2005

(30) Foreign Application Priority Data
Dec. 20, 2003   (GB) .................................. 0329615.9

(51) Int. Cl.
*F01D 11/10* (2006.01)
(52) U.S. Cl. ................ 415/110; 415/168.2; 415/171.1; 415/173.5
(58) Field of Classification Search ................ 415/110, 415/144, 221, 168.2, 173.1, 173.6
See application file for complete search history.

(56) References Cited

U.S. PATENT DOCUMENTS

| | | | |
|---|---|---|---|
| 3,645,544 A | | 2/1972 | Unsworth |
| 4,311,431 A | * | 1/1982 | Barbeau ................ 415/173.6 |
| 4,863,348 A | * | 9/1989 | Weinhold .................... 416/92 |
| 5,403,158 A | * | 4/1995 | Auxier ...................... 416/97 R |
| 6,276,692 B1 | | 8/2001 | Beeck |
| 6,742,783 B1 | * | 6/2004 | Lawer et al. ............... 277/416 |

FOREIGN PATENT DOCUMENTS

| | | |
|---|---|---|
| GB | 855040 P | 10/1960 |
| GB | 1207544 P | 10/1970 |
| JP | 58152975 A | 3/1982 |
| JP | 63205404 A | 2/1987 |

* cited by examiner

*Primary Examiner*—Edward K. Look
*Assistant Examiner*—Devin Hanan
(74) *Attorney, Agent, or Firm*—W. Warren Taltavull; Manelli Denison & Selter PLLC (57) ABSTRACT

The present invention relates to a seal arrangement in which a substantially labyrinth type seal is utilised between a rotating component and a stationary component such as a housing. An edged fin of the seal arrangement incorporates a slot nozzle or a slot nozzle is associated with a fin in order that fluid flow through those slot nozzles either impinges upon opposed surfaces or at least narrows the available leakage gap width for greater sealing efficiency. Typically, several seal arrangements in accordance with the present invention and possibly in association with simple barrier fins are combined in an assembly to provide an appropriate acceptable combined operational sealing efficiency in a turbine engine.

20 Claims, 10 Drawing Sheets

SEAL ARRANGEMENT

FIELD OF THE INVENTION

The present invention relates to a seal arrangement and more particularly but not exclusively to a seal arrangement used in a turbine engine.

BACKGROUND OF THE INVENTION

Figure 1:
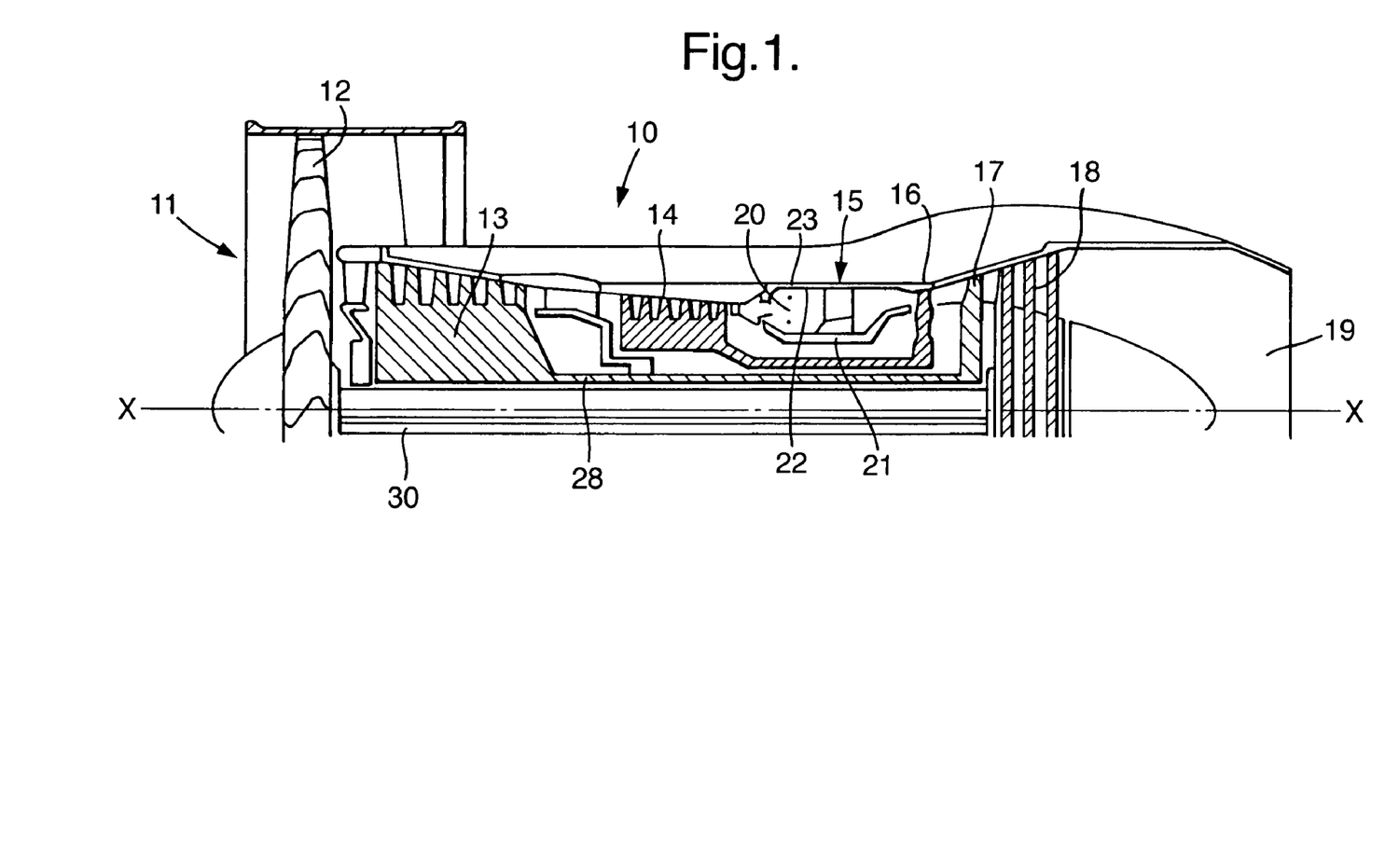
FIG. 1 is a cross-sectional view of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

Figure 2:
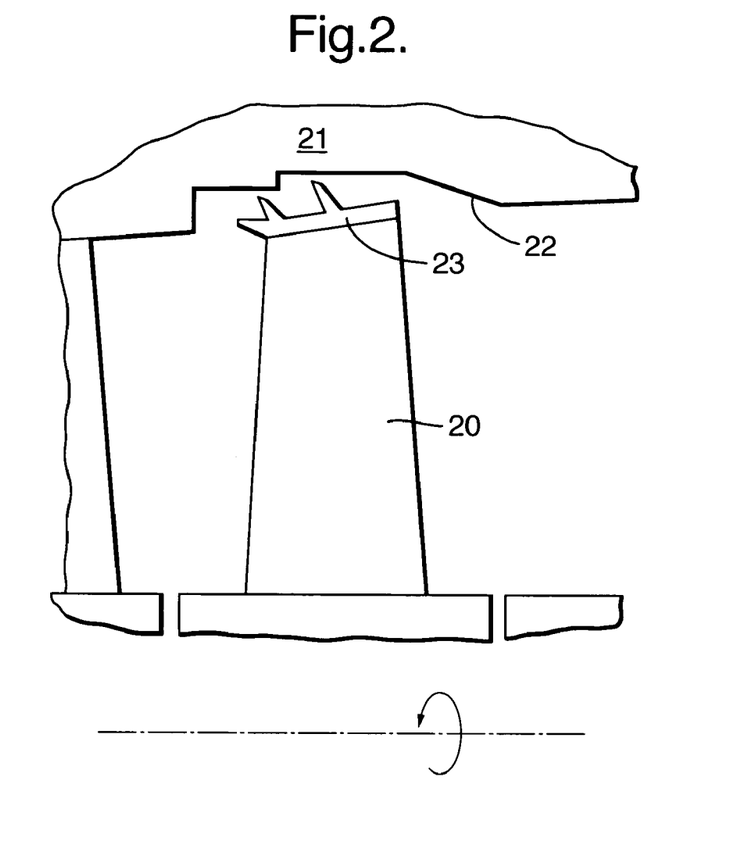
FIG. 2 is a schematic view of a shroud arrangement for a gas turbine engine.

In view of the above, it will be appreciated that control of the working fluid in terms of airflow through the engine is important for efficiency purposes. In such circumstances, leakage of such working fluid must be reduced and minimised. FIG. 2 is a schematic illustration of a shrouded arrangement of a rotor blade 20. The shroud 23 is upon the tips of the blade 20 and rotates within a cavity 22 formed in a housing 21. Nevertheless, it will be appreciated there is still a leakage path caused by the gap between the end of the shroud 23 and the opposed surfaces of the cavity 22.

Previously, in order to minimise leakage, so called labyrinth seals have been used. The labyrinth seals comprise a series of sharp edges or fins which act to constrict fluid flow leakage through the gap of the shroud 23 and the cavity 22. Generally, there are two types of labyrinth seal, one of a "straight through" type where a succession of upstanding edged fins are provided which extend across the leakage gap in order to minimise it. Alternatively, there is a "stepped" type labyrinth seal in which there are again a succession of upstanding edged fins but the opposed surface is stepped to further provide convolution in flow path and therefore constriction of leakage through leakage gaps provided between opposed parts of the upstanding edged fins and the opposed surface to that fin. Labyrinth seals are well-known and there are a large number of varying geometries and types of which the fins may be inclined and otherwise presented for efficient sealing effect. Nevertheless, generally the edged fins are formed from solid metal with sharp machined edges to maximise the constriction of flow through the leakage gap. It will be understood that this leakage is due to pressure differential across the rotary component which is normally a compressor or turbine in an engine. This pressure differential drives the blades or vanes of the turbine or compressor so that any leakage about the edges of these blades or vanes through the leakage gaps reduces efficiency as this pressurised working fluid thereby leaked provides no work and may present detrimental mixing losses.

Figure 3:
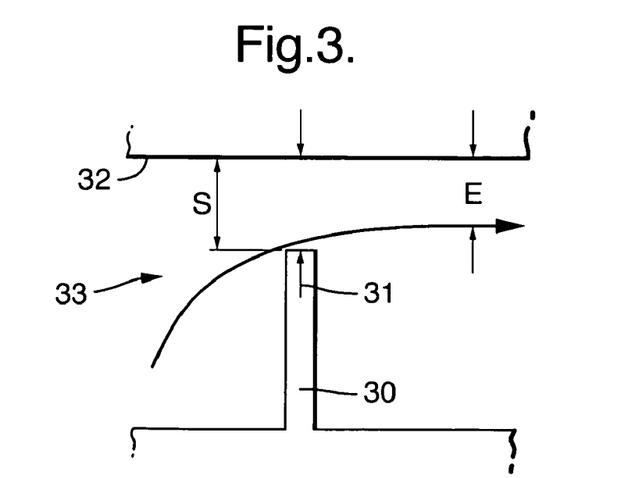
FIG. 3 is a schematic view of a labyrinth seal for a gas turbine engine.

The effectiveness of a labyrinth seal is subject to a number of factors. These factors include manufacturing constraints, in service conditions and geometrical limitations. Normally, the clearance between the upstanding fin and its opposed surface is a significant factor with regard to specification of an appropriate seal. This clearance dimension should be as small as possible within the housing but without rotating part clashes or touching during operation. However, the effective area of the seal as depicted in FIG. 3 will ideally be less due to contraction of the leakage flow after fin 30 if that flow separates from a sharp edged thin surface 31. Thus, as can be seen in FIG. 3, the physical clearance between the fin surface 31 and an opposed surface 32 is depicted by gap S whilst the effective gap E is smaller than gap S due to separation of the fluid flow 33 from the surface 31 as it passes between that surface 31 and the opposed surface 32. The reduction in effective seal area (E) is the result of separation from the sharp edge. It is called a "vena contracta". Compounding the number of this reduced from liquid velocity across the fin because the premium drop is reduced. Multiple constrictions in series reduce the leakage mass flow by reducing the pressure drop across each constriction, hence reducing the leakage velocity through the clearance.

SUMMARY OF THE INVENTION

In accordance with the present invention there is provided a seal arrangement for a rotating component wherein in use there is a pressure differential across the rotating component and an edged fin is provided to limit in use any leakage gap which extends between the rotating component and the housing, the arrangement including a slot directed across that leakage gap in order to present in use a fluid flow to further constrict the available leakage gap as an effective standing fluid sheet there across.

Normally, a barrier fin is provided to facilitate pressure differential control. Preferably, the slot is a nozzle. Typically, the slot has a waisted shape with a convergent-divergent profile through its length towards an outlet. Alternatively, the slot has a convergent profile towards an outlet.

Normally, the slot is located within the edged fin and fluid flow presented towards an opposed surface. Alternatively, the slot is provided in an opposed surface to the edged fin.

Normally, the fluid flow is aligned with and perpendicular to the opposed surface. Normally, the opposed surface will always have the minimum possible clearance. Possibly, the opposed surface is recessed. Possibly, the opposed surface when part of the rotating component includes vanes upon which the fluid flow acts to facilitate rotation of that rotating component.

Possibly, the fluid flow is inclined towards a higher pressure side of the pressure differential in use. Alternatively, the fluid flow is inclined towards a low pressure side of the pressure differential in use.

Possibly, the fin is inclined but the slot is directed to be presented with a different inclination across the leakage gap.

Normally, the fin is located within the rotating component or the housing.

Also in accordance with the present invention, there is provided a seal assembly for a turbine engine including a seal arrangement as described above.

Possibly, the assembly has a stepped relationship between the rotating component and the housing. Alternatively, the assembly has a non-stepped or straight through configuration between the rotating component and the housing. Typically, the stepped relationship will comprise a succession of rising steps.

Advantageously, the assembly includes barrier fins. Possibly, these barrier fins are not associated with a slot positioned to cooperate with the edged fins to obstruct fluid flow. Possibly, the barrier fins are inclined. Normally, the barrier fins have a sharp machined edge. Possibly, the barrier fins prevent spill or back flow of the fluid flow from the slot.

Possibly, slots in both the edged fins and opposed part thereto form the standing fluid sheet there across to further constrict the leakage gap between the rotating component and the housing.

Also in accordance with the present invention there is provided a turbine engine incorporating a seal arrangement or a seal assembly as described above.

BRIEF DESCRIPTION OF THE DRAWINGS

Embodiments of the present invention will now be described by a way of example only with reference to the accompanying drawings in which.

DETAILED DESCRIPTION OF THE INVENTION

As indicated above, labyrinth seals are relatively well-known. In such labyrinth seals, constrictions in the form of edged fins causes any leakage fluid flow to accelerate and form a jet flow. Where the edge of the fin is sharp and relatively thin, there is a separation between this jet flow and the seal surface such that there is an effective narrowing in the freely available leakage gap in comparison with the physical clearance between that fin and an opposite proportion of a surface. Typically, the flow jet then enters a chamber where its kinetic energy is dissipated. Unfortunately, during operation there is a gradual in service deterioration in the sharpness of the fin edge due to wear and any adjacent casing treatments. Furthermore, surface coating to the edge of the fin during manufacture generally causes a rounding of the surface such that it is not possible to provide as sharp an edge as desired which will create the objective jet flow separation for clearance gap constriction. It will be understood that the gap is provided between a rotating component and a usual stationary housing. Thus, variations in the effective leakage gap in effect create variations in the effective cross-sectional area of potential working fluid leakage through the seal. In such circumstances, even a slight deterioration in the edge sharpness can cause significant reductions in the seal performance. In such circumstances, there is a balance between minimising the physical gap with the inherent danger of touching and clash between the rotating component and the housing or a more limited sealing efficiency.

In accordance with the present invention limitation of leakage is achieved through provision in operation of a standing fluid sheet barrier presented across the leakage gap rather than provision of a solid material barrier which may contact and clash. Thus, removing contact and wear problems as well as reducing the effective leakage gap/area allows far greater sealing efficiency. The present invention typically combines a conventional seal with a fin to provide a barrier seal curtain. The description below is principally directed to the fins with slot to create the sealing barrier flow across the arrangement. The conventional barrier fin provides a pressure drop which is necessary for fluid to pass through the constriction it forms, thereby creating a higher pressure behind the sealing fin and reducing the pressure drop acting across the sealing curtain is critical. An intermediate pressure exists even when all the upstream fluid is excluded because the sealing fluid has to pass through the gap. A seal arrangement comprises a combination of conventional seals, for control and performance enhancement, with a sealing curtain projected from a slot. The curtain emerges from, or in association with, a fin.

The present invention will now initially be described with regard to in principle one sealing arrangement in accordance with the invention. However, it will be appreciated a number of sealing arrangements in accordance with the present invention may be presented in a cascade format to provide a consolidated sealing efficiency acceptable for operational performance. In accordance with the present invention in general a slot is arranged across a potential leakage path from one side of a rotating component to another. A slot may be provided with a seal fluid flow at a higher stagnation pressure in comparison with a high pressure side of the rotating component. Alternatively, it is possible to provide a seal with pressures less than that of the inlet if a front containment seal is used. In such circumstances, the fluid flow through the slot provides a sheet of relatively high momentum fluid which crosses the leakage gap to create a constriction and therefore limit leakage through the leakage path between the rotating component and a stationary housing. Normally, the fluid flow through the slot to create the fluid sheet will extend across with sufficient momentum that it impinges upon the opposed side to the slot to in effect inhibit leakage across that fluid flow from the slot. The highest stagnation pressure will normally be determined in order to be sufficient to resist pressure on the high pressure side of the rotating component.

In accordance with the present invention, the slot is associated within a labyrinth seal type format in which the slot is associated with an edged fin whereby in effect the sharp edge of that fin in terms of flow separation for leakage gap constriction is augmented by the fluid flow through the slot in order to create a better sealing efficiency particularly when the edge of the fin is rounded as a result of abrasive wear or other conditions.

It will be appreciated that the fluid flow projected from the slot is effectively turned by pressure difference across the seal which also drives leakage. In such circumstances, as indicated ideally the fluid flow from the slot will impinge upon its opposed surface in order to provide a complete seal. In effect, the pressure differential turns the projected fluid flow from the slot such that if the force of the projected fluid flow from the slot is sufficient in terms of the momentum it will impinge upon the opposed surface but in any event, if turned before such impingement, there will still be a constriction in the available leakage gap which in association with other seal arrangements in accordance with the present invention and/or a barrier element of a labyrinth seal will create an adequate sealing assembly for operational purposes. In such circumstances, the present seal arrangement and seal assembly may provide a total seal which is not possible with a conventional labyrinth seal which by implication must at least have a partial leakage gap between the edged fins for rotary clearance. Furthermore, the present invention allows a total seal without contact between parts of the seal with resultant reduced problems with wear over an operational lifetime. Also, by choice of appropriate slot dimensions and stagnation pressure for projection of the fluid flow to form the fluid sheet, it will be understood that sufficient clearance can be provided between the edged fins and the opposed surfaces to accommodate rotation eccentricity and surface quality whilst ensuring an appropriate seal is achieved. The present invention also allows for seal arrangement cooling by introduction of cooler air to act as the standing fluid sheet barrier created by the fluid flow through the slot. It will also be understood by appropriate control of the fluid flow pressure through the slot in comparison with the pressure differential across the seal arrangement that controlled levels of leakage can be determined. In short, the present invention provides a fluid flow through a slot to augment the effect of a labyrinth seal arrangement of fins whereby the flow jet contraction of the actual available leakage gap width E is further reduced despite rounding of the fin edge both as initially manufactured and as a result of its surface edge wear.

Figure 4:
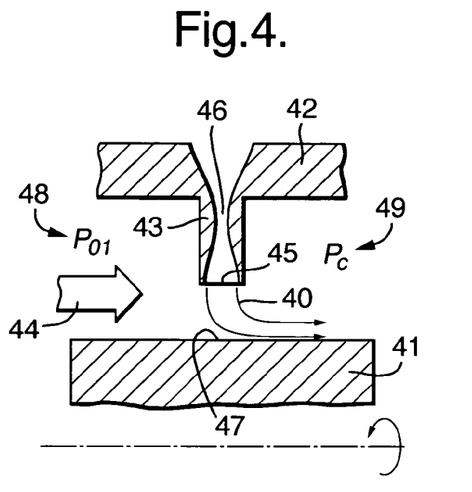
FIG. 4 is a schematic cross-section of a seal arrangement in accordance with a first embodiment to the present invention.

FIG. 4 illustrates a first embodiment of a seal arrangement as a schematic cross-section. Thus, the seal arrangement comprises a rotating component 41 and a housing 42 from which a fin 43 projects towards the component 41. A leakage path occurs in the direction of arrow head 44. A jet of fluid 40 is projected laterally across the gap between an outlet 45 in a slot 46 formed in the fin 43 and an opposed part 47 of the rotating component 41. It will be appreciated that in use there is a pressure gradient between an upstream side 48 and a downstream side 49 of the arrangement. The fin 43 acts as a constriction in the manner of a conventional labyrinth seal.

One or more slots 46 are incorporated within the fin 43 such that there is a projected fluid flow 40 which may be initially perpendicular to the leakage path 44 but which is turned by the leakage flow 44 due to the pressure gradient from high pressure upstream side 48 and a low pressure downstream side 49 along the rotor surface. In such circumstances, the fluid flow 40 creates a fluid sheet seal barrier extending from the fin 43 towards the component 41. In such circumstances, greater sealing efficiency is achieved by the supplemental barrier formed by the flow 40 in addition to the constriction caused by the fin 43 along with the flow 44 lift off from the leading edge of that fin 43 as described previously. The fluid flow 40 has a pressure appreciably higher than that of the leakage flow 44 which in turn has the upstream pressure at side 48. The pressure differential between that of the fluid flow 40 and the upstream pressure of the leakage flow will be adjusted as required for operational performance.

As will be described later, slots can take the form of a nozzle which is either convergent or as depicted in FIG. 4 of a waisted or convergent-divergent cross-section. Where the pressure difference to be sealed, that is to say between upstream side 48 and downstream side 49 is non-uniform about the rotating component axis or across the width of a duct formed between the rotating component 41 and the housing 42 or where the leakage gap between the fin 43 and the surface 47 is non-uniform then the slot 46 width and cross-section may also be non-uniform in order to reflect these variations and provide correct sealing conditions as required.

Figure 5:
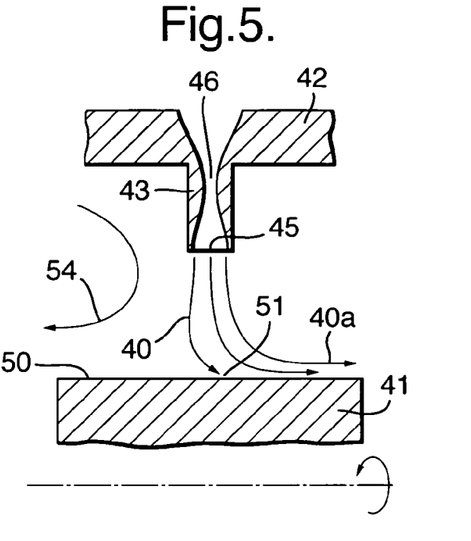
FIG. 5 is a schematic cross-section of the arrangement depicted in FIG. 4 in a first operational state.
Figure 6:
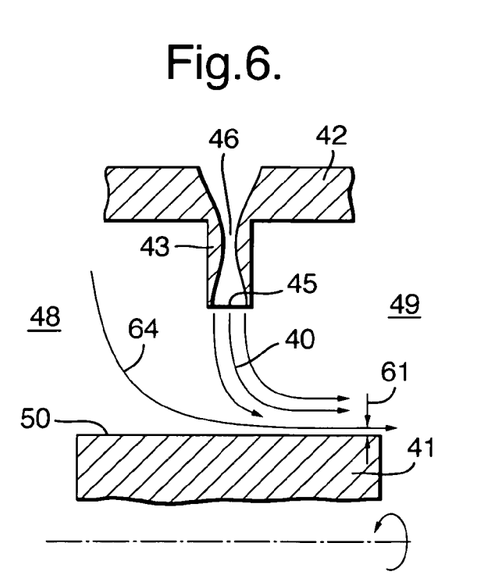
FIG. 6 is a schematic cross-section of the seal arrangement depicted in FIG. 4 in a second operational state.

As indicated above, the slots 46 provide fluid flow 40 in the form of standing fluid sheet barriers across the leakage gap between the end of the fin 43 and the surface 47. The fluid flow 40 which is generally initially presented perpendicularly is turned by the static pressure differential between upstream side 48 and downstream side 49 across the leakage gap. In such circumstances, dependent upon the pressure of the flow 40 relative to the leakage flow 44 pressure, there will be impingement of the flow 40 upon the surface 47 of the rotary component 41 or not. FIGS. 5 and 6 illustrate these situations respectively.

FIG. 5 illustrates in schematic cross-section a first operational state where there is fluid flow 40 impingement upon an upper surface 50 of the rotary component 41. Thus, the flow 40 is projected from the outlet 45 of the slot nozzle 46 in the fin 43 which in turn projects from the housing 42. Thus, as can be seen the fluid flow 40 has sufficient pressure differential in comparison with the leakage flow, indicated by arrow head 54, such that there is direct impingement upon the surface 50 in order to create a total seal barrier. It will be noted that the flow 40 creates a stagnation point 51 which establishes the upstream extent of the seal barrier created by fluid sheets constituted through the flow 40. This flow 40 then impinges upon the surface 50 which then migrates along that surface 50 to leave the seal arrangement in the direction of arrow heads 40*a*, that is to say becomes part of the downstream lower pressure of the arrangement. Thus, with such direct impingement upon the surface 50, a substantially total seal is achieved by the arrangement depicted in FIG. 5.

FIG. 6 illustrates a second operational state of the seal arrangement depicted in FIG. 4 in which the fluid flow 40 does not impinge upon the surface 50. Thus, fluid flow 40 is again projected from the outlet 45 of the slot nozzle 46 towards that surface 50 but there is insufficient flow pressure or momentum to overcome the diversive effect of the leakage flow 64. In such circumstances, the leakage flow 64 turns the fluid flow 40 prior to impingement and therefore the flow sheet barriers formed by that flow 40 do not stretch completely across the leakage path between the end of the fin 43 and the surface 50. However, the effect of the flow 40 is to reduce the effective freely available leakage path width or gap 61 to that depicted in FIG. 6. It will be appreciated that a reduced leakage gap width will in turn limit the extent of leakage beyond the seal arrangement and therefore overall sealing efficiency of the seal arrangement in comparison with a simple fin constriction in accordance with normal labyrinth seal arrangements. Thus, although some of the leakage flow 64 will still pass through the arrangement, this will be significantly less than with previous arrangements. It will be appreciated that with a total seal, the upstream side 48 and downstream side 49 will be substantially stagnant in terms of flow across the seal arrangement. It is in comparison with this stagnant or standing pressure created within the upstream side 48 that the present invention must present a fluid flow 40 with sufficient momentum to achieve either total sealing through impingement upon the surface 50 or at least a significant reduction in the freely available leakage gap width for improved sealing efficiency. Momentum of the flow 40 is important in terms of the potential turning effect of the leakage flow 44, 54, 64.

Figure 7:
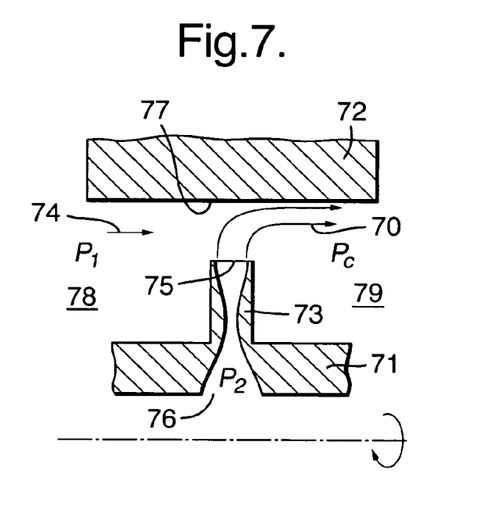
FIG. 7 is a schematic cross-section of a seal arrangement in accordance with a second embodiment of the present invention.

FIG. 7 illustrates a second embodiment of a seal arrangement in accordance with the present invention. Thus, a rotating component 71 is configured relative to a housing 72 such that a fin 73 formed and projecting from the rotating component 71 acts as a constriction to a leakage flow 74. A fluid flow 70 from an outlet 75 of a slot nozzle 76 formed in the fin 73 acts to create a complete or partial reduction in the leakage gap width available to that flow 74 and therefore increases sealing efficiency. As previously, an upstream side 78 is at a higher pressure P1 than at a downstream side 79 with the fluid flow 70 presented through the slot nozzle 76 at a significantly greater pressure P2 than that at the upstream side 78. If the pressure differential between P1 and P2 is sufficiently great, then there is impingement by the flow 70 upon the housing 72 surface 77 for a total seal whilst a lower pressure differential will turn the flow 70 but nevertheless reduce the available leakage gap width with enhanced sealing performance accordingly. In short, the second embodiment depicted in FIG. 7 differs from the first embodiment depicted in FIGS. 4 to 6 in that the fin 73 and therefore slot nozzle 76 is incorporated within the rotating component 71 rather than in the typically stationary housing 72. The pressure P2 essentially determines the momentum of the flow 70 and therefore its ability to impinge upon the opposing surface. Strictly, pressure P2 determines the mach number of the jet—which gives the achievable velocity when temperature is known.

Figure 8:
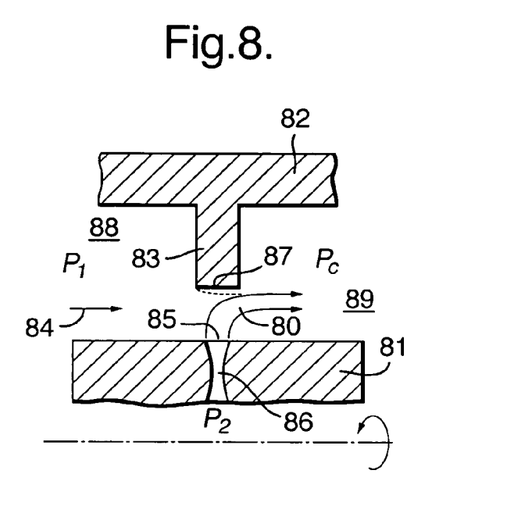
FIG. 8 is a schematic cross-section of a seal arrangement in accordance with a third embodiment of the present invention.

FIG. 8 illustrates a third embodiment of a seal arrangement in accordance with the present invention. Thus, a rotating component 81 is associated with a housing 82 such that there is a fin 83 extending across a duct spacing between them to act as a constriction to a leakage flow 84. However, in comparison with previous embodiments, a slot nozzle 86 is not located within the fin 83 but rather within a flat surface. In such circumstances, a fluid flow 80 again acts to form a fluid sheet as a sealing barrier across the leakage gap between an end surface 87 of the fin 83 and an opposed flat surface, in the depicted embodiment, in the rotating component 81. As indicated previously, providing a fin 83 with a sharp edge causes annular leakage flow jet lift off which in itself reduces the freely available leakage gap compared to the physical clearance between the rotating component 81 and end surface 87. Thus, the fluid flow 80 in the form of flow sheets will augment that leakage gap width reduction in order to further inhibit leakage flow 84 passage from a high pressure side 88 to a low pressure side 89. As previously, it is the differential pressure between the sides 88, 89 which stimulates leakage flow 84 but it is the relative difference in the upstream notional stagnant pressure P1 and the pressure P2 of the fluid flow 80 which essentially controls the degree of leakage gap width constriction provided by the seal arrangement. If pressure P2 is sufficiently greater than pressure P1, then the flow 80 will impinge upon the opposed surface in order to create a total seal but lower pressure differentials will nevertheless still limit the leakage gap width and therefore improve sealing efficiency.

Figure 9:
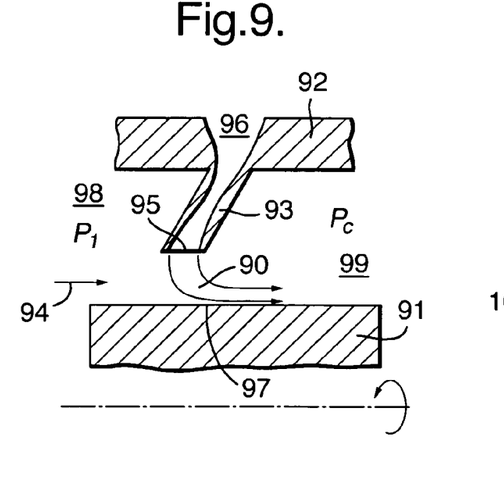
FIG. 9 is a schematic cross-section of a seal arrangement in accordance with a fourth embodiment of the present invention.
Figure 10:
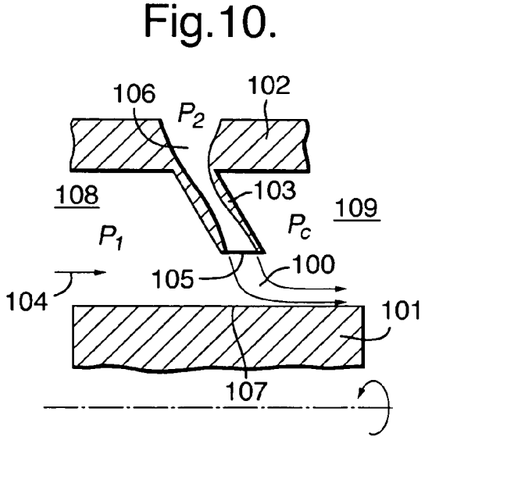
FIG. 10 is a schematic cross-section of a seal arrangement in accordance with a fifth embodiment of the present invention.

Normally, the fins 43, 73, 83 depicted with regard to the first, second and third embodiments of the present invention depicted in FIGS. 4 to 8 will be radial, that is to say, substantially perpendicular to the base surface from which they project. Alternatively, as depicted in FIGS. 9 and 10 fins in accordance with the present invention may be inclined forwardly, that is to say towards the high pressure side of a seal arrangement or rearwardly, that is to say towards the low pressure side of the seal arrangement. Particular choice of fin orientation will depend upon operational requirements.

FIG. 9 illustrates forward projection of a fin 93 in accordance with the present invention. Thus, a rotating component 91 is associated with a housing 92 such that the fin 93 projects forwardly from that housing 92 towards the rotating component 91. The fin 93 incorporates a slot nozzle 96 with an output 95 to project a fluid flow 90 towards that rotating component 91. An upstream high pressure side 98 of the arrangement has a notional stagnant pressure P1 which stimulates a leakage flow 94 towards a clearance gap between the outlet 95 and the rotating component 91. The fin 93 acts as a constriction to that flow 94 whilst the fluid flow 90 as indicated previously is turned by the pressure difference between sides 98, 99. If the pressure differential between the high pressure side 98 (pressure P1) and the pressure P2 of the flow 90 is sufficiently great then that flow 90 impinges upon the rotating component 91 due to its momentum in order to create a total seal whilst lower pressure differentials will not cause impingement by the flow 90 upon the rotating component 91 but will still narrow the available leakage gap width for improved sealing efficiency in comparison with a simple labyrinth fin constriction. Forward projection inputs a momentum to the sealing jet that must be overcome by the pressure differential. This means that for a given sealing mass flow, the forward projected jet will bear a greater pressure difference.

FIG. 10 illustrates a rearwardly inclined fin 103 incorporated within a housing 102 associated with a rotating component 101. The fin 103 incorporates a slot nozzle 106 which has a housing through which a fluid flow 100 is presented towards the rotating component 101. As previously, the fin 103 acts as a constriction between a high pressure side 108 and a low pressure side 109. The pressure differential between the high pressure side 108 and a low pressure side 109 stimulates a leakage flow 104 through a clearance gap between the end of the fin 103 and the upper surface of the rotating component 101. As previously, a fluid flow 100 is projected from the slot nozzle 106 through the outlet 105 in order to augment the effect of the fin 103 by reducing the available leakage gap width for the leakage flow 104. In such circumstances, if the flow 100 has a projection pressure P2 which is sufficiently great in comparison with the notional stagnation pressure P1 on the high pressure side 108 then the fluid flow 100 will impinge upon the rotating component 101 to provide a total seal. A lower pressure differential between P1 and P2 will cause the fluid flow 100 to be turned by the pressure difference between sides 108, 109 prior to such impingement but nevertheless there will be a reduction in the leakage gap width available to that leakage flow 104 and therefore greater sealing efficiency.

Figure 11:
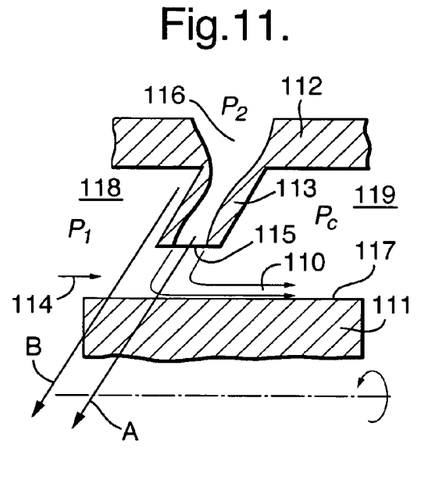
FIG. 11 is a schematic cross-section of a seal arrangement in accordance with a sixth embodiment of the present invention.
Figure 12:
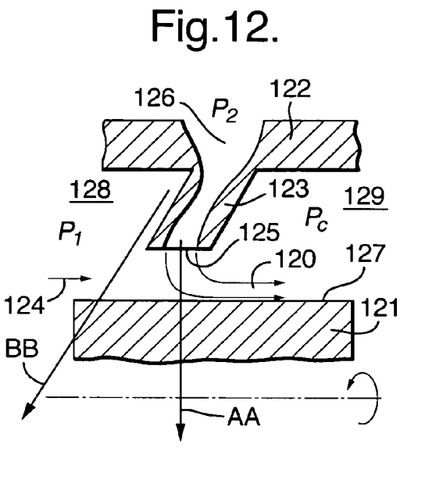
FIG. 12 is a schematic cross-section of a seal arrangement in accordance with a seventh embodiment of the present invention.

FIGS. 11 and 12 illustrates sixth and seventh embodiments of seal arrangements in accordance with the present invention. These sixth and seventh embodiments respectively illustrate that the fluid sheet seal barrier created by fluid flow can be inclined or perpendicularly projected within a respective inclined fin. For illustrative purposes, a forwardly inclined fin is utilised, but it will be appreciated that a rearwardly inclined fin could also be used. It will be understood that a radial fin could supply an angled jet.

FIG. 11 illustrates a forwardly inclined fin 113 from which a fluid flow 110 is projected at an inclination angle A which is co-planar with an inclination angle B of the fin 113. In such circumstances, the fluid flow 110 is incident upon a leakage flow 114 due to the pressure differential between a high pressure side 118 and a low pressure side 119. In such circumstances, if the pressure differential between the upstream side (pressure P1) and the pressure P2 of the flow 110 is sufficiently great than that flow 110 will impinge upon the surface 117 of the rotating component 111 to cause a total seal. Lower pressure differentials will not provide impingement by the flow 110 upon the surface 117 but will nevertheless reduce the freely available leakage gap width available for the leakage flow 114 and so improve seal efficiency. As previously, the fin 113 is secured in a housing 112 whereby an outlet 115 projects the flow 110 at the angle A towards the leakage flow 114 whilst the fin 113 itself is inclined at an angle B for appropriate physical constriction to that flow 114.

FIG. 12 illustrates a forwardly projecting fin 123 in which a slot nozzle 126 projects a fluid flow 120 towards a surface 127 of a rotating component 121. The fin 123 projects from a housing 122 to act as a constriction between a high pressure side 128 and a low pressure side 129. The fin 123 has an inclination angle B but the fluid flow 120 is projected at any angle towards the surface 127 by an outlet 125 of the fin 123. In such circumstances, by pressure differentials between the high pressure side 128 (pressure P1) and the fluid flow (pressure P2) the fluid flow 120 may impinge upon the surface 127 or at least extend significantly across a clearance gap between an end of the fin 123 and the surface 127 in order to achieve an appreciable reduction in the leakage gap width available to a leakage flow 124 stimulated by the pressure differential between the high pressure side 128 and the low pressure side 129.

Figure 13:
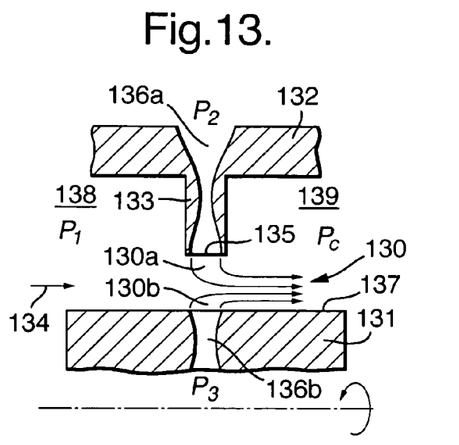
FIG. 13 is a schematic cross-section of a seal arrangement in accordance with an eighth embodiment of the present invention.

FIG. 13 illustrates an eighth embodiment of a sealing arrangement in accordance with the present invention. Thus, a rotating component 131 is arranged with a housing 132 such that a fin 133 projects between them. In this eighth embodiment, not only the fin 133 but also an opposed part of the rotating component 131 incorporate slot nozzles 136a, 136b through which respective fluid flows 130a, 130b are projected in order to provide a consolidated fluid flow sheet barrier 130 to resist a leakage flow 134. Thus, the labyrinth seal effects of a constriction fin 133 are augmented by the fluid flows 130a, 130b in order to provide a more efficient seal. The leakage flow 134 is stimulated by the pressure differential between a high pressure side 138 and a low pressure side 139. In such circumstances, if the pressure differentials between the high pressure side (pressure P1) and pressures P2, P3 of the flows 130a, 130b are sufficiently great then the fluid flows 130a, 130b are sufficiently powerful in terms of momentum to create a complete sealing barrier in the form of a standing fluid flow sheet 130 which will prevent leakage flow 134 passing beyond the seal arrangement between the high pressure side 138 and the low pressure side 139. However, if the pressure differentials are not adequate either individually or in combination then the effect of the flows 130a, 130b will still be to provide a reduction in the available leakage gap for the leakage flow 134 and therefore improve sealing efficiency over that previously provided by a simple fin barrier 133 in a labyrinth seal.

Figure 14:
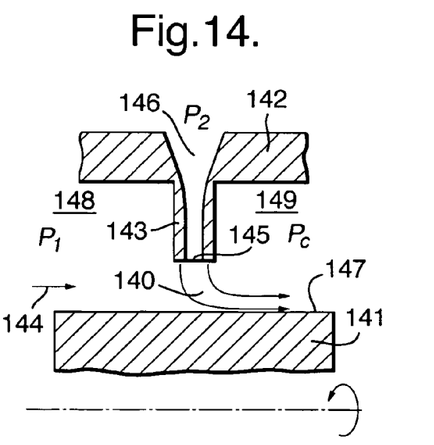
FIG. 14 is a schematic cross-section of a seal arrangement in accordance with a ninth embodiment of the present invention.

All the previous embodiments described above with regard to the present invention have provided a slot nozzle in which there is a convergent-divergent profile. FIG. 14 illustrates a ninth embodiment of a seal arrangement in accordance with the present invention in which a simple convergent slot nozzle 146 incorporated within a fin 143 is provided such that a fluid flow 140 projected from an outlet 145 of that slot nozzle 146 is presented in order to obstruct a leakage flow 144. As previously, the leakage flow 144 is stimulated by pressure differentials between a high pressure side 148 and a low pressure side 149. The fin 143 acts as a physical constriction to that flow 144 and also through leakage flow jet contraction effect about the sharp edge of that fin 143 acts to restrict the available leakage gap width. The fluid flow 140 augments that sealing function by projection towards a surface 147 of the rotating component 141. As previously, if the pressure differential between the high pressure side 148 (P1) and the propulsive pressure P2 of the fluid flow 140 is sufficient then there is impingement upon the surface 147 and a total seal is provided. Lower pressure differentials will not cause impingement by the flow 140 upon the surface 147 but will still reduce the available leakage gap width and therefore restrict the leakage flow 144 with resultant greater sealing efficiency.

Figure 15:
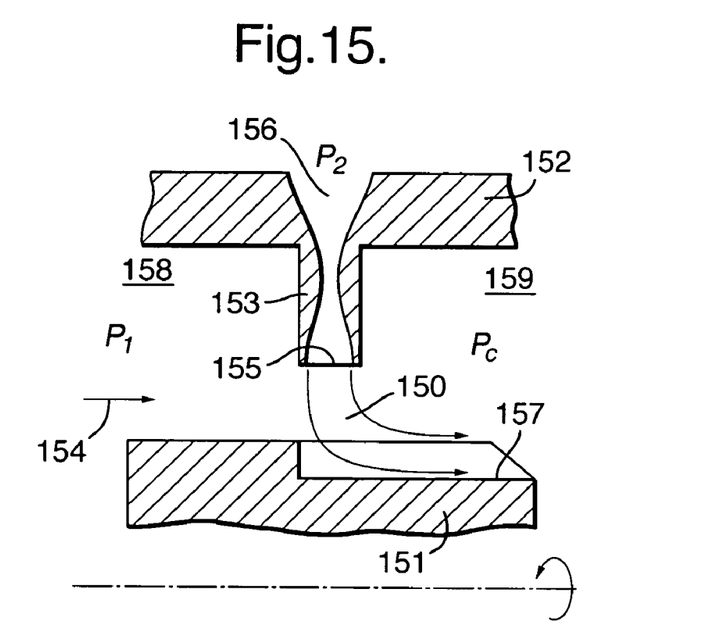
FIG. 15 is a schematic cross-section of a seal arrangement in accordance with a tenth embodiment of the present invention and consistent with FIG. 21 below.
Figure 21:
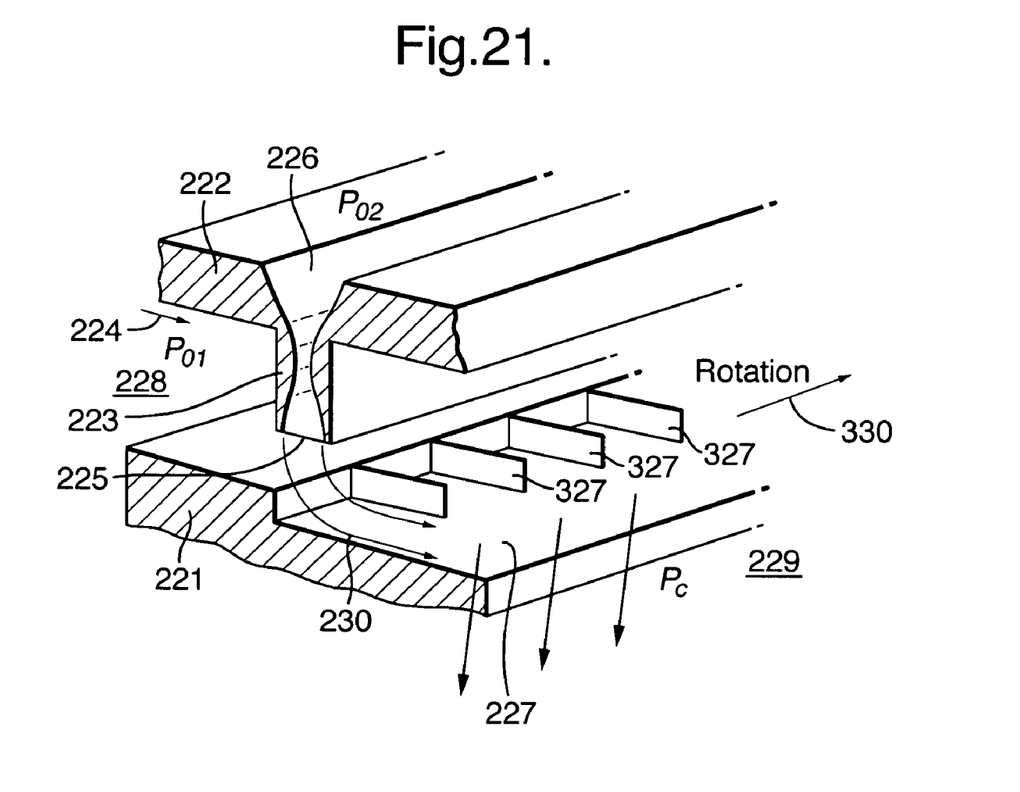
FIG. 21 is a schematic perspective of a seal assembly in accordance with a sixth combination of the present invention.

FIG. 15 illustrates a tenth embodiment of a sealing arrangement in accordance with the present invention which is also consistent with FIG. 21 described later. Thus, a fin 153 projects between a housing 152 and a rotating component 151 such that a slot nozzle 156 through an outlet 155 projects a fluid flow 150 towards that rotating component 151. The fin 153 acts as a constriction to a leakage flow 154 stimulated by the pressure differential between a high pressure side 158 and a lower pressure side 159. As previously, the fluid flow 150 has a propulsion pressure P2 and if the pressure differential between this pressure P2 and that of the high pressure side (pressure P1) is sufficiently great then the flow 150 impinges upon opposed surfaces 157 of the rotating component 151. In accordance with the tenth embodiment depicted in FIG. 15, the opposed surface of the rotating component 151 is recessed such that the turning effect of the leakage flow 154 has greater distance to operate such that there can be greater control of any required leakage due to a reduced but not eliminated leakage gap width by providing such a recessed opposed surface in the rotating component 151. The recessed portion is the space between the turbine vanes as depicted in FIG. 21.

In order to provide an appropriate seal across a rotating component utilising a labyrinth seal, it will be appreciated that a number of seal arrangements comprising an edge fin are typically required. Thus, in accordance with the present invention, a seal assembly is described comprising a number of seal arrangements in an appropriate cascade arrangement about a rotating component in order to achieve sealing efficiency across the seal assembly.

Figure 16:
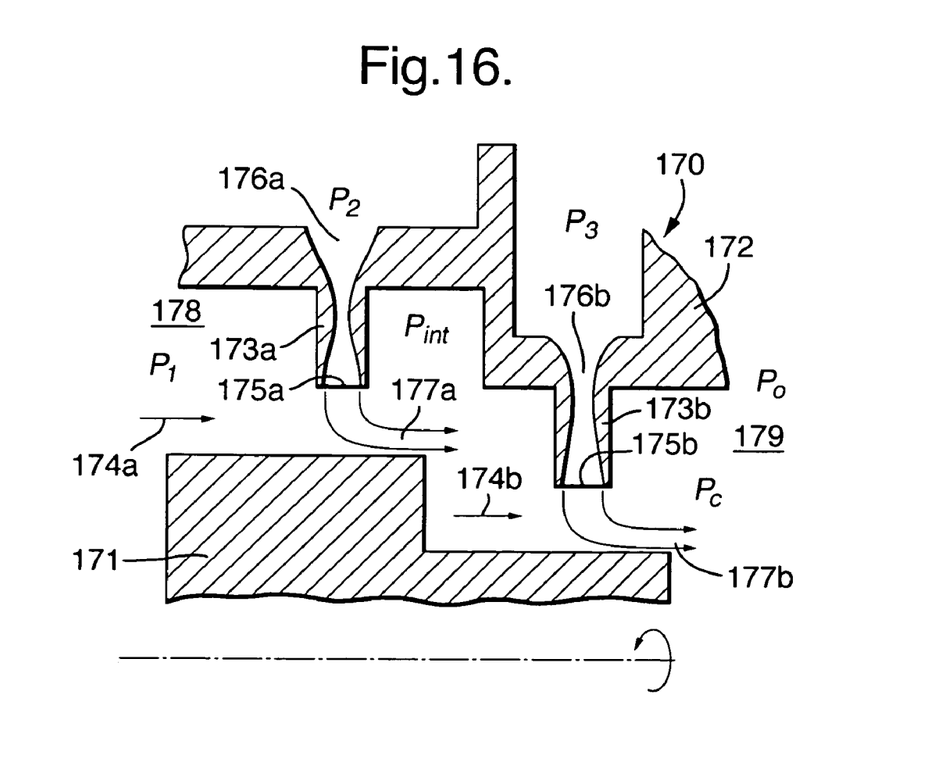
FIG. 16 is a schematic cross-section of a seal assembly in accordance with a first combination of the present invention.

FIG. 16 illustrates a first seal assembly as a combination of seal arrangements as described above. Thus, the assembly 170 comprises a rotating component 171 and a housing 172. There is a stepped relationship between opposed surfaces of the housing 172 and the rotating component 171 is typical with labyrinth seals incorporating edged fins 173 to restrict leakage flow 174 through the assembly 170. However, the relationship does not need to be stepped. As previously, the edged fins 173 incorporate slot nozzles 176 which in turn have outlets 175 through which fluid flow 177 is propelled. The fluid flow 177 acts as described previously in order to augment the constriction of the fins 173 and reduce the available leakage gap width in order to further create a fluid sheet barrier which provides a total seal, or at least improves sealing efficiency for the assembly 170. Thus, in the two sealing arrangement combination of FIG. 16, a high pressure side 178 has a pressure P1 whilst a low pressure side 179 has a lower pressure with an intermediate pressure in the portion of duct spacing between the sealing arrangements. As indicated previously, the momentum of the respective fluid flows 177a, 177b acts to force these flows 177a, 177b across the leakage flows 174a and 174b. If there is a sufficient pressure differential between pressure P1 and pressure P2 then fluid flow 177a will impinge upon an opposed surface of the rotating component 171 in order to approximate a complete seal. Similarly, if there is a sufficient pressure differential between the intermediate pressure within the duct cavity between the sealing arrangements and the pressure of the fluid flow 177b/P3 then this fluid flow 177b will also impinge upon its opposed surface of the rotating component 171 to provide a total seal. As indicated above, the leakage flow 174 as a result of notional stagnation pressure at the high pressure side 178 and within the intermediate cavity duct between the sealing arrangements will tend to turn the respective flow 177a, 177b as shown in FIG. 16. Generally, it will be appreciated that there is a significant energy and work loss by providing excessive fluid flow 177 momentum and pressure. Thus, provision of sufficient pressure P2 or P3 may be inefficient so that a determination of just acceptable levels for such pressures P2, P3 whilst achieving adequate sealing efficiency will be made. In such circumstances, there will remain a limited leakage gap width to form the leakage flow 174 at each sealing arrangement. However, the cascade combination of sealing arrangements along with the constriction of the respective fins 173, leakage flow lift off reduction in actual leakage gap width and the stepped relationship will create an appropriately efficient sealing assembly 174 for operational requirements.

Figure 17:
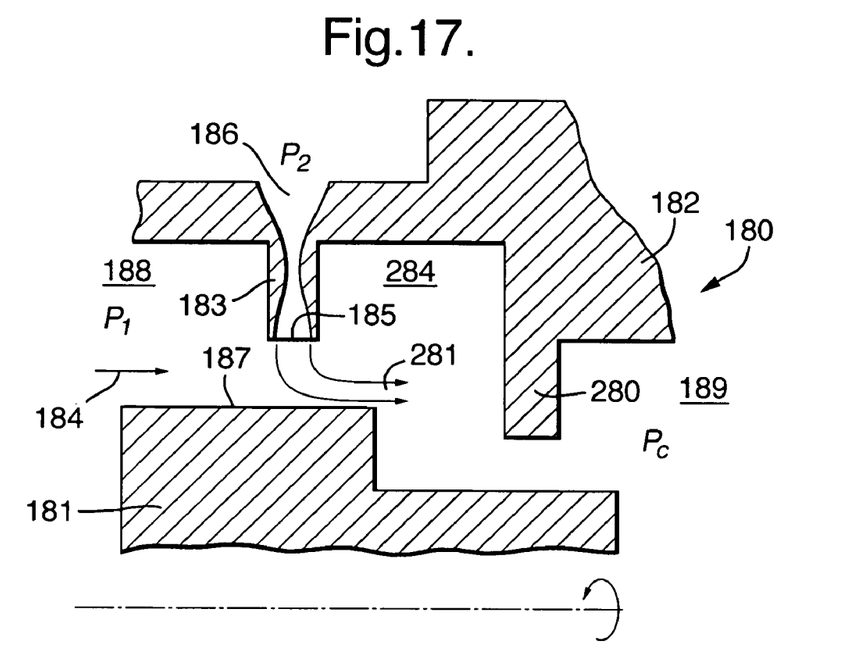
FIG. 17 is a schematic cross-section of a seal assembly in accordance with a second combination in accordance with the present invention.

FIG. 17 illustrates a second seal assembly combination in accordance with the present invention. Thus, rather than providing two seal arrangements in accordance with the present invention, the assembly 180 depicted in FIG. 17 has one such arrangement associated with a simple conventional barrier fin 280. The seal arrangement in accordance with the present invention comprises a fin 183 within which a slot nozzle 186 with an outlet 185 is located. A fluid flow 281 is presented from the outlet 185 towards an opposed surface 187 of the rotating component 181. The flow 281 as described previously, acts as a fluid sheet barrier across the clearance spacing between the end of the fin 183 and the surface 187. In such circumstances, dependent upon the momentum of the flow 281, the seal assembly 180 may be completely sealed by the flow 281 or the available leakage gap width reduced significantly by that flow 281. In such circumstances, by a combination of the seal arrangement in accordance with the present invention along with a conventional barrier fin 280 an efficient seal assembly is provided with an intermediate pressure at 284 therebetween.

The fin barriers choke flow by forming a seal using a sealing flow. A pressure difference is essential for the flow 281 to pass through the contraction at 280. The pressure differential across the sheet barrier is reduced with the result that the arrangement is closer to a total seal than previously possible with this type of arrangement. Flow 281 needs a pressure drop to pass through the contraction under fin 280. Thus, the intermediate pressure is raised, reducing the pressure differential across the barrier flow.

Figure 18:
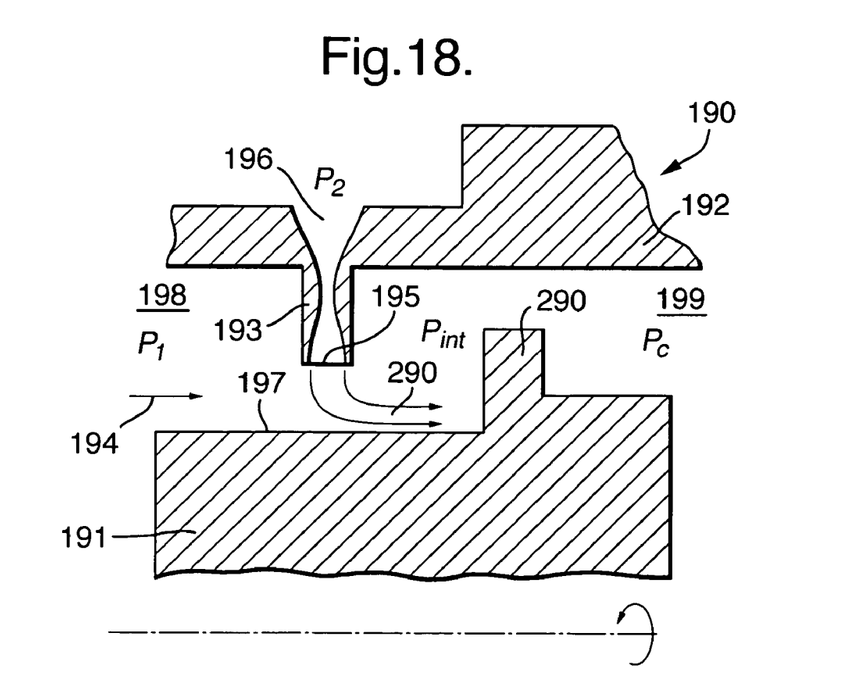
FIG. 18 is a schematic cross-section of a seal assembly in accordance with a third combination of the present invention.

The assembly 180 depicted in FIG. 17 again provides a stepped relationship between the rotating component 181 and the housing 182 in accordance with conventional labyrinth constriction techniques to further improve sealing efficiency. Alternatively, as depicted in FIG. 18 showing a third embodiment of a sealing assembly combination in accordance with the present invention is associated with a conventional barrier fin 290 in order to create an appropriate sealing assembly 190. The assembly 190 incorporates a sealing arrangement as described previously in accordance with the present invention in the form of an edged fin 193 through which a slot nozzle 196 presents a fluid flow 290 through an outlet 195. The fins 193, 290 act initially as a conventional labyrinth seal to provide constriction to a leakage flow 194 between a high pressure side 198 and a low pressure side 199 of the assembly 190. The fluid flow 290 operates in accordance with the present invention described above. Thus, as a result of pressure differentials between P1 at the high pressure side and P2 for the fluid flow 290, that flow 290 may impinge upon a surface 197 of the rotating component 191 or at least significantly towards that surface 197 in order to eliminate or reduce the available leakage gap width for the leakage flow 194. The barrier fin 290 supplements the existing fin 193 and provides improved leakage gap width constriction in order to achieve greater overall efficiency for the assembly 190.

Figure 19:
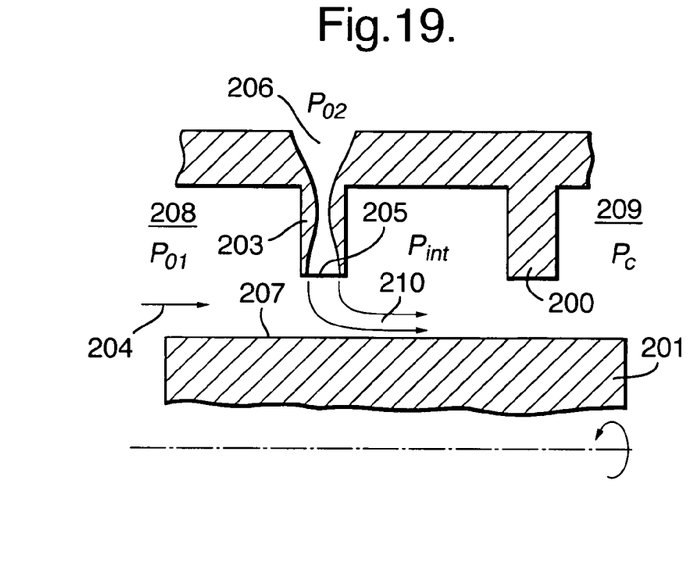
FIG. 19 is a schematic cross-section of a seal assembly in accordance with a fourth combination of the present invention.

FIG. 19 illustrates a fourth seal assembly combination in accordance with the present invention. Thus, a simple barrier fin 200 in a housing 202 is associated with a seal arrangement in accordance with the present invention as described previously. The respective fins 200, 203 act in accordance with a conventional labyrinth seal arrangement in order to provide a constriction to a leakage flow 204 from a high pressure side 208 to a low pressure side 209 of the assembly. In accordance with the sealing arrangement as described previously, a fluid flow 210 is projected through an outlet 205 of a slot nozzle 206 in the fin 203 towards a surface 207 of a rotating component 201. Depending upon the momentum of the fluid flow 210, a total seal or at least a significant reduction in the available leakage gap width is provided by that flow 210 in order to augment the constriction provided by the seal 203 and leakage flow jet lift off as described previously about a sharp edge to the seal 203. In such circumstances, greater sealing efficiency is achieved. The downstream simple barrier fin 200 provides further sealing efficiency for the sealing assembly. The fin 200 reduced the pressure differential across the fluid flow 210 path by creating a pressure drop, i.e. creating an intermediate pressure.

Figure 20:
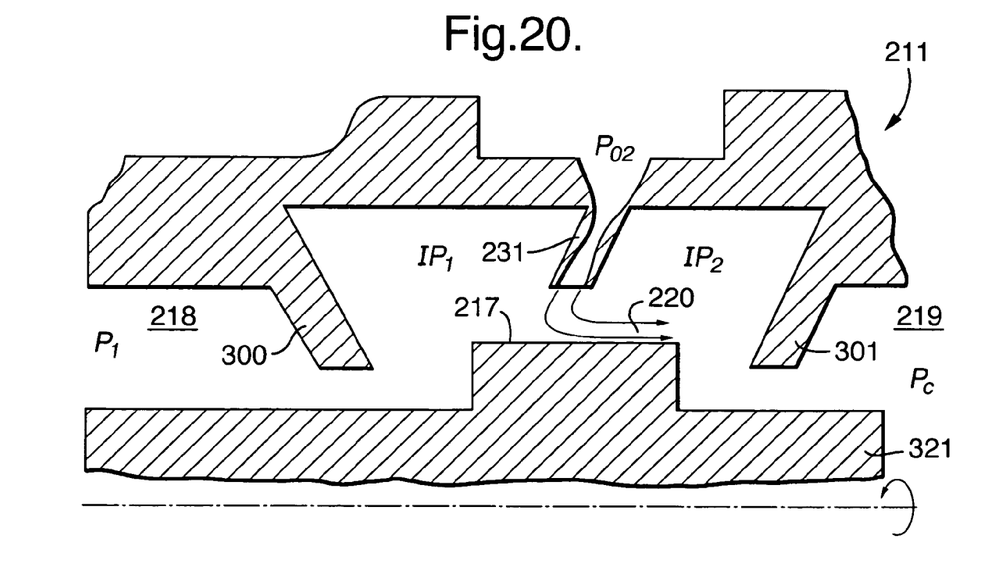
FIG. 20 is a schematic cross-section of a seal assembly in accordance with a fifth combination of the present invention.

It will be appreciated from the embodiments of seal assemblies described already that multiple staged fins provide in combination an appropriate seal. In such circumstances, the proportion of pressure difference that each individual seal arrangement, whether it will be in accordance with the present invention or simple conventional barrier fin approaches is reduced. Furthermore, in order to generate the necessary fluid flow to create a fluid sheet barrier in accordance with the present invention, that fluid flow must essentially penetrate the leakage flow such that there is a danger of upstream flow rather than downstream flow of the sealing fluid flow subsequent to a sealing arrangement in accordance with the present invention. In such circumstances, as depicted in FIG. 20, it is advisable to provide a sealing assembly 21 which inhibits such upstream of the fluid flow used to provide sealing. A sealing arrangement in accordance with the present invention comprises a fin 231 projecting towards a rotating component 321 is positioned intermediate to barrier fins 300, 301 such that the fin 300 creates an intermediate pressure IP1 on one side of the fin 231 and there is an intermediate pressure IP2 on the other side of that fin 231. The seal assembly 211 as previously acts to provide a seal barrier between a high pressure side 218 with a pressure P1 and a low pressure side 219. By use of the fin 300, it will be appreciated that some of the sealing duties provided by that fin 300 in creating the intermediate pressure IP1 are such that the sealing pressure to achieve total sealing required by the fluid flow 220 is lower. Thus, the momentum of that flow 220 can be reduced whereby the possibility of inadvertent upstream flow is reduced. Without the fin 300, it will be appreciated that the fin 231 and flow 220 if a total seal arrangement were to be provided would need to have a greater pressure P2 propelling the flow 220 and this greater pressure P2 may cause upstream movement of the flow 220 with detrimental consequences. Typically, the flow 220 impinges upon an opposed surface 217 of the rotating component 321. This surface 217 is elevated as shown in order to enhance the labyrinth constriction of the simple barrier fins 300, 301 for greater sealing efficiency. It will be understood it is the combination of conventional and sealing fins which is integral to the present invention.

FIG. 21 illustrates a sixth embodiment of a seal assembly combination in accordance with the present invention. As described previously, the fluid flow presented through slot nozzles in accordance with seal arrangements of the present invention generally provides no work with regard to operation of an engine. In such circumstances, there is inefficiency with regard to the lost work energy. In FIG. 21, a rotating component 221 is associated with a housing 222 from which a fin 223 projects towards that rotating component 221. The fin 223 as indicated previously, acts as a constriction in accordance with labyrinth seal principles, but also incorporates a seal nozzle 226 with an outlet 225 from which a fluid flow 230 projects towards opposed surfaces 227 of the rotating component 221. The assembly depicted in FIG. 21 operates as described previously with regard to seal arrangements such that dependent upon the momentum of the flow 230 is either sufficient for impingement upon the surface 227 or substantial projection towards that surface 227 whereby the leakage gap width for a leakage flow 224 from a high pressure side 228 to a low pressure side 229 is at least reduced for greater sealing efficiency. However, in accordance with the embodiment depicted in FIG. 21, the surface 227 incorporates fins 327 which engage the flow 230 in order to assist rotation in the direction of arrow head 330. Thus, the flow 230 provides some work by interacting with vanes 327 rather than simply contributing to the low pressure side 229. Similarly, some of the leakage flow 224 if there is not a total seal may interact with the vanes 237 to provide some work to assist rotation. It should be appreciated that rotation of the rotating component 221 will only be assisted by the flow 230 and possibly leakage flow 224, whilst other means will principally provide for such rotation, in a turbine engine this means will be through combustion. The geometry of vanes 327 is not critical but is not limited to the flat plate types shown in FIG. 21.

Figure 22:
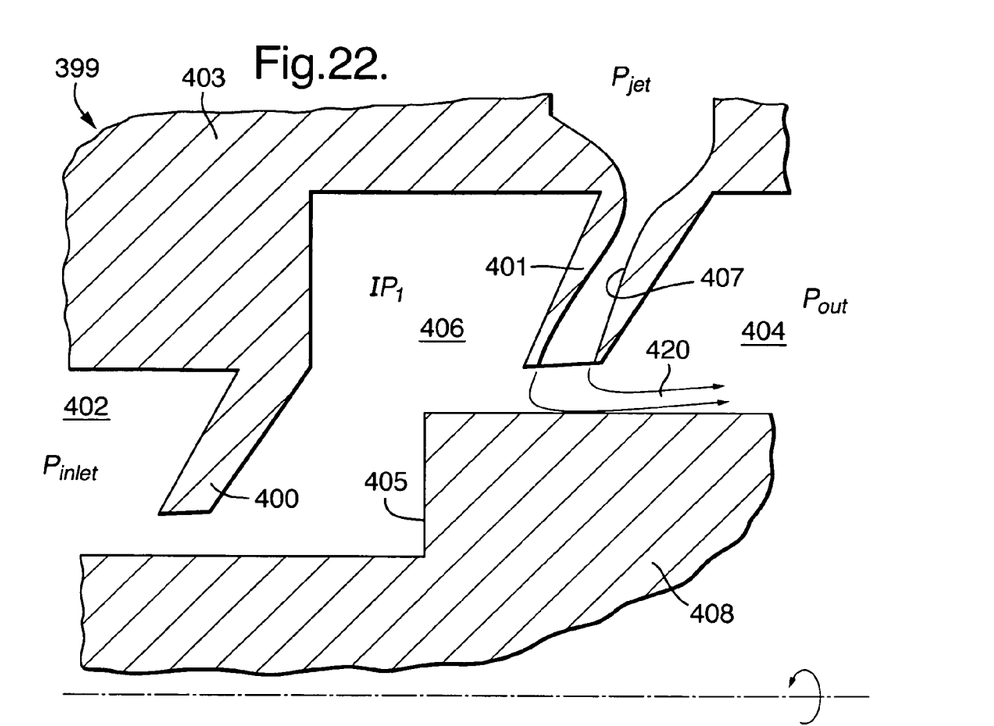
FIG. 22 is a schematic cross-section of a seal assembly in accordance with a seventh combination of the present invention; and, FIG. 23 is a schematic cross-section of a seal assembly in accordance with an eighth combination of the present invention.

FIG. 22 provides a schematic cross-section of a seal assembly 399 in accordance with a seventh combination of the present invention. Thus, pressure at an inlet side 402 is substantially isolated from an outlet side 404 through a barrier fin 400 and a fin 401 from which a flow 420 is projected from a slot 407. Between the fin barrier 400 and the fin 401 an intermediate pressure is created in an area 406. In such circumstances a rotating component 400 incorporates a step 405 whereby there can be close association between the barrier 400 and the fin 401 formed in a stationary component or structure 403.

Figure 23:
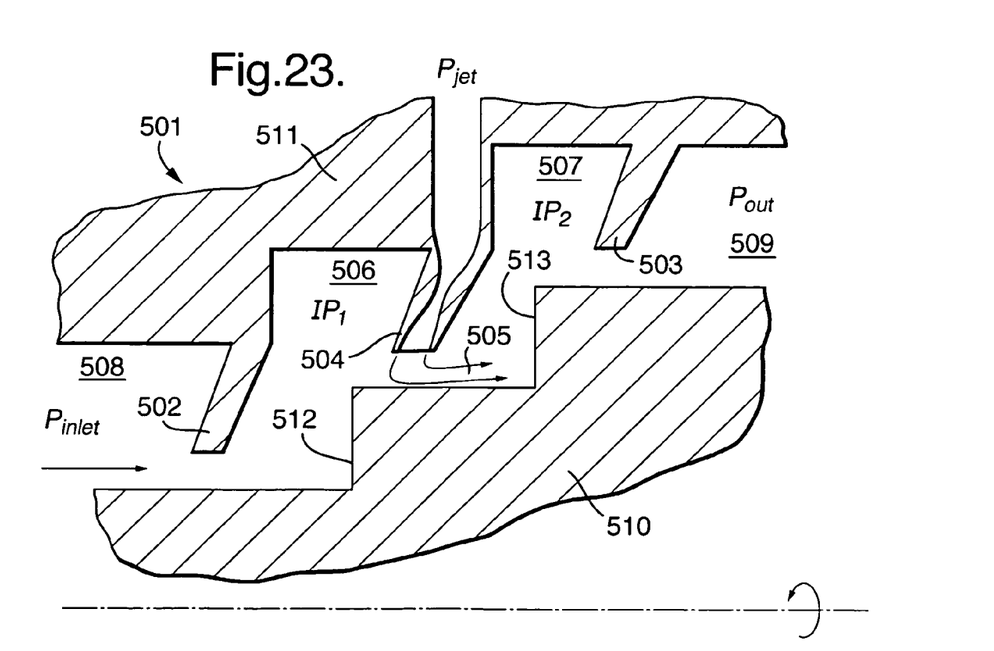

FIG. 23 provides a schematic cross-section of a seal assembly 501 in accordance with an eighth combination of the present invention. The assembly 401 is similar to that depicted in FIG. 22, but in addition to a barrier fin 502 in front of a slotted fin 404, there is a further barrier fin 503 downstream of that slotted fin 404. A rotating component 510 incorporates steps 512, 513 associated with the fins 502, 503, 504. In such circumstances an inlet pressure at 508 is substantially isolated from an outlet pressure 509 through the barriers 502, 503 and slotted barrier 504 projecting a fluid flow 505 towards the rotating component 510. Intermediate pressure zones at 506, 507 are utilised in order to achieve the best sealing efficiency whilst allowing sufficient spacing between the ends of the fins 502, 503, 504 and the rotating component 510 to accommodate rotational eccentricities. The present invention provides a means of enhancing the performance of a labyrinth seal by providing a fluid flow from edged fins or upstanding constriction components whereby greater sealing efficiency can be achieved whilst maintaining appropriate clearance gaps to avoid clashing. In such circumstances, although manufacture of seals in accordance with the present invention will be more complicated, greater efficiency can be achieved and seals which approach total efficiency may be obtainable provided suitable pressure differentials can be achieved for projection of the fluid flow creating the fluid sheet barrier across the clearance between the fin edge and the opposed surface.

Although described as working fluid and fluid flow, it will be understood that normally these fluids will be air flows utilised to provide sealing within an engine. Normally, the leakage flow comprises combustion products whilst the sealing flow is air or possibly steam. Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A seal arrangement for a component wherein there is a pressure differential across the component and an edged fin is provided to limit any leakage gap which extends between the component and a housing, the arrangement including a slot directed across said leakage gap in order to present a fluid flow to further constrict the available leakage gap as an effective standing fluid sheet there across wherein said slot directs said fluid sheet laterally across said leakage gap between said fin and said component.

2. An arrangement as claimed in claim 1, wherein the slot is a nozzle.

3. An arrangement as claimed in claim 1, wherein the slot has a waisted shape with a convergent-divergent profile through its length towards an outlet.

4. An arrangement as claimed in claim 1, wherein the slot has a convergent profile towards an outlet.

5. An arrangement as claimed in claim 1, wherein the slot is located within the edged fin and fluid flow presented towards an opposed surface.

6. An arrangement as claimed in claim 5, wherein the fluid flow is aligned with and perpendicular to the opposed surface.

7. An arrangement as claimed in claim 1, wherein the slot is provided in an opposed surface to the edged fin.

8. An arrangement as claimed in claim 1, wherein the fluid flow is inclined towards a higher pressure side of the pressure differential.

9. An arrangement as claimed in claim 1, wherein the fluid flow is inclined towards a lower pressure side of the pressure differential.

10. An arrangement as claimed in claim 1, wherein the fin is inclined but the slot is directed to be presented with a different inclination across the leakage gap.

11. An arrangement as claimed in claim 1, wherein the fin is located within the component or the housing.

12. A seal assembly for a turbine engine including a seal arrangement as claimed in claim 1.

13. An assembly as claimed in claim 12, wherein the assembly has a stepped relationship between the component and the housing in a labyrinth seal configuration.

14. An assembly as claimed in claim 12, wherein the assembly has a non-stepped configuration between the component and the housing.

15. An assembly as claimed in claim 14, wherein the barrier fins are inclined.

16. An assembly as claimed in claim 12, wherein the assembly includes leakage barrier fins positioned to cooperate with the edged fins to collectively limit flow through the assembly.

17. An assembly as claimed in claim 12, wherein slots in both the edged fins and an opposed part thereto form the standing fluid sheet there across to further constrict the leakage gap between the component and the housing.

18. A turbine engine incorporating a seal arrangement as claimed in claim 1.

19. A seal arrangement for a rotating component wherein there is a pressure differential across the rotating component and an edged fin is provided to limit any leakage gap which extends between the rotating component and a housing, the arrangement including a slot directed across said leakage gap in order to present a fluid flow to further constrict the available leakage gap as an effective standing fluid sheet there across wherein the slot is located within the edged fin and fluid flow presented towards an opposed surface wherein the opposed surface is recessed.

20. A seal arrangement for a rotating component wherein there is a pressure differential across the rotating component and an edged fin is provided to limit any leakage gap which extends between the rotating component and a housing, the arrangement including a slot directed across said leakage gap in order to present a fluid flow to further constrict the available leakage gap as an effective standing fluid sheet there across wherein the slot is located within the edged fin and fluid flow presented towards an opposed surface wherein the opposed surface when part of the rotating component includes vanes upon which the fluid flow acts to facilitate rotation of that rotating component.

* * * * *